(12) United States Patent
Glen

(10) Patent No.: US 9,924,134 B2
(45) Date of Patent: Mar. 20, 2018

(54) DYNAMIC FRAME RATE ADJUSTMENT

(71) Applicant: ATI Technologies ULC, Markham (CA)

(72) Inventor: David I. J. Glen, Toronto (CA)

(73) Assignee: ATI Technologies ULC, Markham, Ontario (CA)

(*) Notice: Subject to any disclaimer, the term of this patent is extended or adjusted under 35 U.S.C. 154(b) by 179 days.

(21) Appl. No.: 14/313,522

(22) Filed: Jun. 24, 2014

(65) Prior Publication Data

US 2014/0307166 A1    Oct. 16, 2014

Related U.S. Application Data

(63) Continuation of application No. 11/468,887, filed on Aug. 31, 2006, now abandoned.

(51) Int. Cl.
| | |
|---|---|
| G06T 1/00 | (2006.01) |
| G09G 5/18 | (2006.01) |
| H04N 7/01 | (2006.01) |
| G09G 3/20 | (2006.01) |
| H04N 5/46 | (2006.01) |
| H04N 21/4402 | (2011.01) |
| H04N 21/443 | (2011.01) |

(Continued)

(52) U.S. Cl.
CPC ........... *H04N 7/0127* (2013.01); *G09G 3/20* (2013.01); *H04N 5/46* (2013.01); *H04N 21/4436* (2013.01); *H04N 21/440281* (2013.01); *H04N 21/4621* (2013.01); *G09G 2340/0435* (2013.01); *H04N 21/4122* (2013.01)

(58) Field of Classification Search
None
See application file for complete search history.

(56) References Cited

U.S. PATENT DOCUMENTS 6,522,363 B1    2/2003  Deiss
6,801,811 B2    10/2004 Ranganathan
(Continued)

FOREIGN PATENT DOCUMENTS

EP    1239448 A    9/2002
EP    1280129 A    1/2003
(Continued)

OTHER PUBLICATIONS

EP Patent Office; International Search Report; International Application No. PCT/IB2007/003044; dated Feb. 15, 2008.
(Continued)

*Primary Examiner* — Tize Ma
(74) *Attorney, Agent, or Firm* — Faegre Baker Daniels LLP

(57) ABSTRACT

An image rendering unit (IRU) of a device determines the dynamic frame rate capabilities (DFRCs) of a display and an image frame rate of content to be displayed. Preferably, the DFRCs are stored in a storage device deployed within the display itself. Based on the DFRCs and the image frame rate for the content, the IRU determines an updated frame rate and thereafter provides the content to the display at the updated frame rate. Where control of power consumption is desired, selection of a reduced frame rate can effect a power savings. In this manner, the present invention provides flexible control over display frame rates and/or power consumption of the device.

12 Claims, 2 Drawing Sheets

(51) Int. Cl.
*H04N 21/462* (2011.01)
*H04N 21/41* (2011.01)

(56) References Cited

U.S. PATENT DOCUMENTS

| | | |
|---|---|---|
| 2003/0058206 A1 | 3/2003 | Lee |
| 2004/0252115 A1 | 12/2004 | Boireau |
| 2005/0057551 A1 | 3/2005 | Gong |
| 2005/0068311 A1 | 3/2005 | Fletcher et al. |
| 2005/0128220 A1 | 6/2005 | Marrin et al. |
| 2005/0223249 A1 | 10/2005 | Samson |
| 2006/0033744 A1 | 2/2006 | Perez |
| 2006/0066601 A1* | 3/2006 | Kothari ............ G02B 26/001 345/204 |
| 2006/0092187 A1* | 5/2006 | Wang ............... G09G 5/005 345/698 |
| 2006/0146056 A1 | 7/2006 | Wyatt |
| 2008/0055318 A1 | 3/2008 | Glen |

FOREIGN PATENT DOCUMENTS

| | | |
|---|---|---|
| WO | 03100759 A | 4/2003 |
| WO | 2007002921 A | 1/2007 |
| WO | 2008026070 A2 | 3/2008 |

OTHER PUBLICATIONS

EP Patent Office; Written Opinion; International Application No. PCT/IB2007/003044; dated Feb. 15, 2008.
"VESA DisplayPort Standards v1.0", Specs & Formats, Audioholics Online A/V Magazine; Aug. 21, 2005; http://www.audioholics.com/techtips/specsformats/VESADisplayPort.php.
"Hardware details for OLPC", from OLPCWiki, maintained from a document written by Michael Bove by Jim Gettys, http://wiki.laptop.org/go/Hardware_specification.

* cited by examiner

DYNAMIC FRAME RATE ADJUSTMENT

RELATED APPLICATIONS

This application is a continuation of U.S. application Ser. No. 11/468,887, filed Aug. 31, 2006, owned by instant assignee and is incorporated herein by reference.

FIELD OF THE INVENTION

The present invention relates generally to providing content to displays and, in particular, to techniques for dynamically adjusting frame rates at which content is displayed.

BACKGROUND OF THE INVENTION

As known in the art, images are provided to displays, such as computer or television (TV) displays, many times per second, i.e., at the display refresh or frame rate. Traditionally, displays do not gracefully support changes in the display refresh rate. During a rate change, they typically go blank and/or display corrupted images. As a result, such rate changes are performed relatively rarely, e.g., when changing the display mode, starting or stopping a full screen application (such as a video game) or when changing the power source between alternating current (AC) and direct current (DC).

It is also known that moving images appear best to the human eye when the display refresh rate matches the image update or frame rate (i.e., the rate at which the separate frames of an image are provided by the image source; also referred to hereinafter as the image rate) of the video or graphics (examples of what are referred to hereinafter as "content"). Depending on the source of the content, the image rate might typically be anywhere from 24 Hz to over 100 Hz, or 0 Hz in the case of a static image. Further still, certain types of content have varying frame rates, or frame rates may change as different content types are displayed, e.g., film material on a television typically has an image rate of 24 or 25 Hz, whereas video material may have images rates at 30, 50 or 60 Hz. Further still, displays are known to consume power based, in part, on how frequently they are refreshed; higher refresh rates consume more power, whereas lower rates consume less.

Various technologies are known that address issues similar to variable frame rates. For example, there are systems that employ "selective refresh", such as the Digital Packet Video Link standard (DPVL) promulgated by the Video Electronics Standards Association (VESA). Based on comparisons with previous frames, selective refresh systems send only that portion of a display image that has changed each refresh period. Because the amount of data transmitted to the display from the image source (e.g., a graphics processor) can be less than full resolution, power savings may be realized. However, each display requires a full resolution frame buffer thereby adding to the cost of the display. Additionally, the display is still refreshed at a fixed rate independent of the image update rate.

Some high-end flight simulation systems are known to couple the refresh rate of the projector(s) to the three-dimensional (3D) graphics rendering rate (i.e., image rate) of the graphics processor(s) so that the image update rate dynamically adjusts to the image rate. However, these systems do not couple the display rate to the image rate for any other type of content, e.g., video image rate, nor are they configured to provide power savings. Furthermore, such systems are built using projection display systems, rather than displays more commonly associated with computers or televisions.

In both analog and digital TV systems, so-called "genlock" systems accommodate switches between sources possibly having slightly different refresh rates. In analog TV, this results in a period of corrupted images while the system adapts to the new frame rate. However, such systems cover only a fairly narrow range of vertical frequencies (related to the refresh rates) and no display refresh rate adjustment is done for power saving. Some digital TV systems avoid screen corruption when the video image rate changes through use of a complex frame rate conversion system. Even for digital TV systems that can smoothly adjust the display rate to match the input image rate, it is still expected that these systems (like analog TVs) can only work with a narrow range of vertical rates, and they do not take power savings into account.

Many digital TV systems (and computer video playback systems) use "inverse telecine" to convert the image rate of video back into progressive film rate images at 24 or 25 Hz. The converted video is then converted to the fixed refresh rate of the display. In these systems, the rate of the display is fixed and does not respond dynamically to changes in the rate of the video without causing some visible artifacts. Some systems will first do inverse telecine (if film content is detected) and then do an interpolated image rate conversion to the fixed display rate. These systems handle mixed film and video content well as the frame rate conversion can dynamically adjust the video image rate to the fixed rate of the display. However the results are still inferior to systems without these capabilities, and no power savings are taken into account.

More recently, Intel Corporation has proposed using a frame buffer in a display to allow the display interface between the image source and the display to be dynamically shut down when the display image is static, thereby saving power. However, the frame buffer in the display adds to the cost and power consumption of the display and, given that the display rate is fixed, no power is saved through control of the refresh rate. In another Intel proposal, the image source (e.g., the graphics processor) detects when the image is static and dynamically switches to a so-called "interlaced" display update whereby only half of the rows in the display are refreshed each period, resulting in power savings. However, this idea does not work with content comprising moving images, or at the least, will result in visual artifacts. Further still, this approach does not help with matching image rates of other content to the display refresh rate (or vice versa).

Therefore, it would be advantageous to provide techniques that allow for dynamically adjusting the refresh rate of the display. Displays with this technology can both lower power consumption when the image is changing slowly, and optimize the appearance of moving images by tuning the display frame rate to match the image frame rate.

BRIEF DESCRIPTION OF THE DRAWINGS

The features of the present invention are set forth with particularity in the appended claims. The invention itself, together with further features and attendant advantages, will become apparent from consideration of the following detailed description, taken in conjunction with the accompanying drawings. One or more embodiments of the present invention is now described by way of example only, with reference to the accompanying drawings wherein like referenced numerals represent like elements and in which:

DETAILED DESCRIPTION OF THE PRESENT EMBODIMENTS

Briefly, the present invention provides a technique for dynamically adjusting frame rate of a display based at least in part upon the image rate of content to be displayed thereon. Where a given display, which may be integral with or external to a device, possesses dynamic frame rate capabilities, an image rendering unit (IRU) of the device can determine the dynamic frame rate capabilities (DFRCs) of the display and additionally determine an image frame rate of content to be displayed. The DFRCs can be pre-stored in memory associated with or otherwise available to the IRU, including storage devices that may be deployed within the display itself. Based on the DFRCs and the image frame rate for the content, the IRU determines an updated frame rate and thereafter provides the content to the display at the updated frame rate. Where control of power consumption is desired, a maximum frame rate of the display can be set as the initial frame rate although, of course, other frame rates other than the maximum frame rate may be used as the initial frame rate. Thereafter, selecting an the updated frame rate less than the initial frame rate can effect a power savings. Alternatively, or in addition to the use of the image frame rate, the updated frame rate can be determined based in part upon a power condition of the device or upon a user input provided to the device. In this manner, the present invention provides flexible control over display frame rates and/or power consumption of the device.

Figure 1:
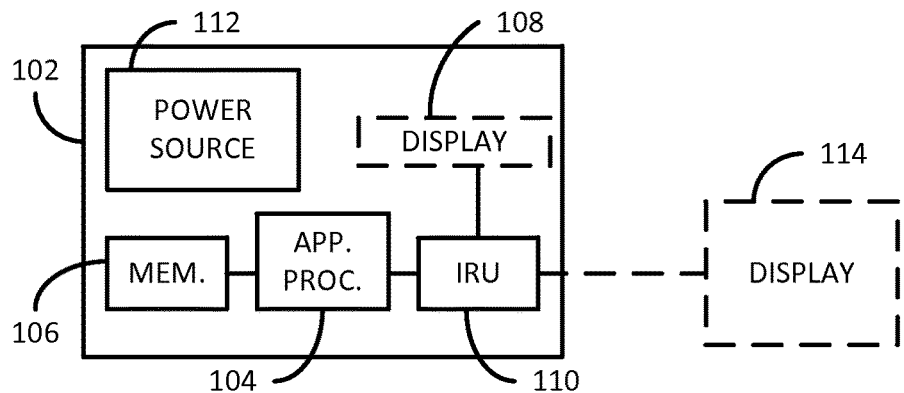
FIG. 1 is an illustration of a device capable of providing images on a display in accordance with the present invention.

Referring now to FIG. 1, a device 102 in accordance with the present invention is illustrated. As used herein, a device may comprise virtually anything capable of displaying image data, such as a computer, a television, a mobile communication device such as a cellular telephone, etc. Although greatly simplified in FIG. 1, the device 102 will typically comprise an application or host processor 104 having one or more associated memory devices 106. As known in the art, the application processor 104, which generally controls operation of the device 102, typically comprises a microprocessor, microcontroller, digital signal processor or combination thereof that operates upon data, and under the control of executable instructions, stored in the memory devices 106. The memory devices 106 may comprise any combination of volatile and non-volatile memory, such as random-access memory (RAM), read-only memory (ROM), etc. Thus configured, the application processor 104 can implement a wide array of functionality in the form of software programs including, for example, programs adapted to provide images (e.g., graphics, still images, video, etc.) to a display.

As shown, the application processor 104 is in communication with an IRU 110, which in turn is in communication with one or more displays 108, 114. An IRU 110, in accordance with the present invention, may comprise any component capable of providing image data (i.e., signals, in any form, that cause a given image to be displayed) to a display. For example, the IRU 110 may comprise one or more suitably configured graphic processors such as a suitably configured discrete or integrated graphics processor, or processors designed for specific devices such as digital televisions or handheld/mobile devices, as manufactured by ATI Technologies, Inc. In an alternative embodiment, some or all of the functionality of the IRU 110 may be incorporated in the application processor 104. As shown in FIG. 1, a first display 108 may be integral to the device 102 as in the case, for example, of a laptop computer, personal digital assistant, etc. Alternatively, or in addition to the first display 108, the IRU 110 may be in communication with an external display 114 as in the case, for example of a desk top computer. Furthermore, the device 102 comprises a power source 112 that, in the case of a portable or mobile device, may comprise a battery or similar finite power source, or a less constrained power source such as an AC power source. Alternatively, where the device 102 is relatively immobile, such as a desk top computer or television, the power source 112 may be more limited and comprise, for example, an AC power source.

Figure 2:
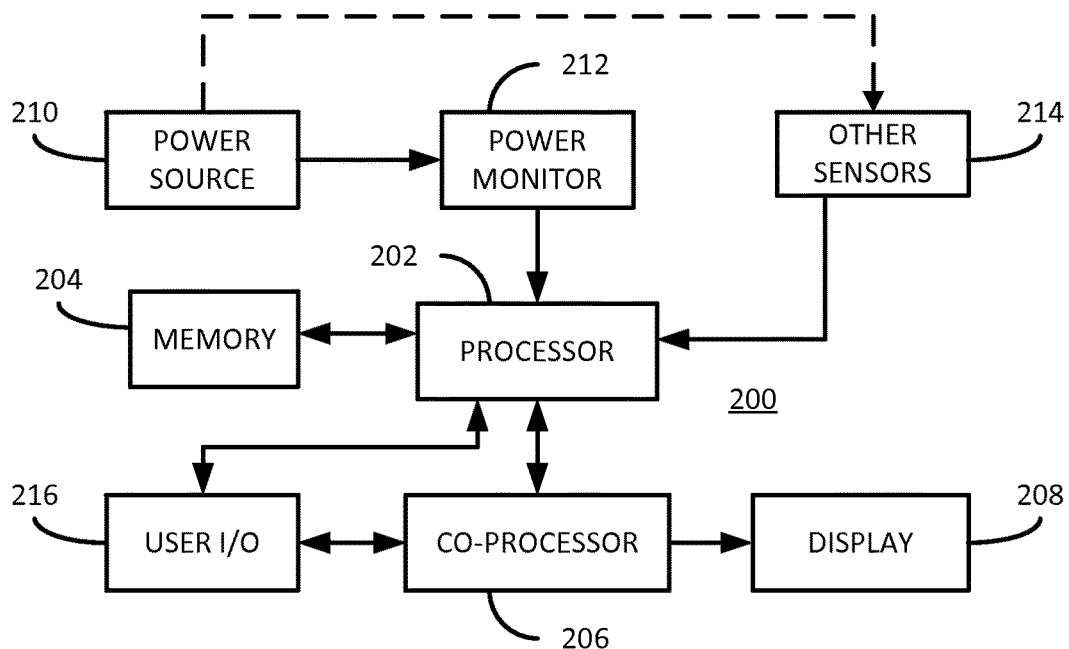
FIG. 2 is a schematic block diagram of an exemplary implementation of a device in accordance with the present invention.

FIG. 2 illustrates a schematic block diagram of a exemplary implementation of a device in accordance with a present invention as shown. In particular, the device 200 comprises at least one processor 202, such as an application processor as described above, in communication with one or more memory devices 204, as also described above. At least one co-processor 206, that may be used to implement an IRU as described above, is in communication with the processor 202. In turn, the co-processor 206 is in communication with at least one display 208.

A power source 210 for the device 200 is provided as shown, and in the present preferred embodiment, is in communication with a power monitor 212 that, in turn, preferably provides data concerning a power condition of the device (e.g., in a battery powered device, the rate at which the battery is discharging or the amount of stored charge left; or in an AC powered device, the rate at which power is being consumed) to the processor 202 (as shown) or the co-processor 206 (not shown). Further still, in the case where the display 208 is not powered by the power source 210 for the device 200 (as in the case of a projector coupled to a battery powered laptop computer), the power source being monitored may include the power source for the display 208. Furthermore, other sensors 214 such as temperature sensors, vibration sensors, moisture sensors or other components known to those having skill in the art can also be provided. For example, a temperature sensor may be provided to monitor the temperature of the power source 210 as illustrated by the dashed line. In this manner, temperature of the power source 210 (or other parameters depending on the nature of the specific sensor(s) 214) can also be used as an input when determining the power condition of the device.

Although not shown in FIG. 2, the co-processor(s) 206 may share the memory 204 with the processor 202 and/or use local memory accessible only to the co-processor(s) 206. As known in the art, such coprocessors are used to offload certain processing tasks from the processor 202 thereby allowing the processor 202 to handle other processing tasks. Depending on the image frame rate of the content being provided to the display 208, the co-processor(s) 206 may be called into greater or lesser use thereby affecting the overall power consumption of the device 200. Finally, the device 200 may comprise one or more user input/output devices 216 in communication with the processor 202. Such devices are known in the art and include, but are not limited to, keyboards, keypads, pointer devices, buttons, microphones, touch screens, display screens, on-screen control panels, speakers, annunciators, or any other device that allows the user of the device 200 to provide input to or receive output from the device 200. In one embodiment of the present invention, described below, an input device 216 may be used to manually initiate the dynamic frame rate techniques taught by the present invention.

Figure 3:
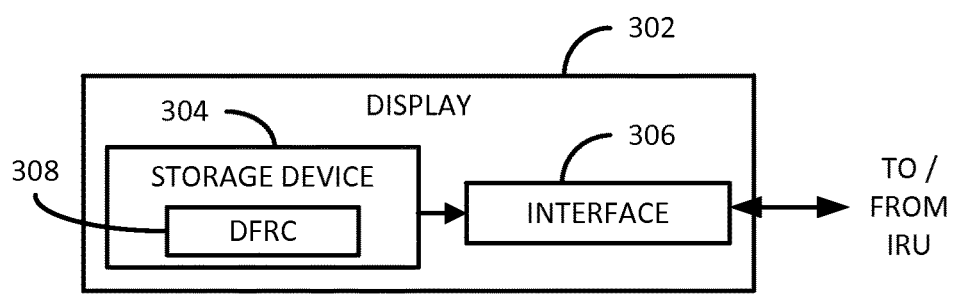
FIG. 3 is a schematic block diagram of a display in accordance with the present invention.

Referring now to FIG. 3, a simplified schematic block diagram of an exemplary display 302 in accordance with the present invention is shown. In particular, the display 302 comprises a storage device 304 in communication with an interface 306. The storage device 304 is used to store parameters that may be employed when implementing the present invention. For example, the storage device 304 may comprise a so-called "extended display identification data structure" (EDID) as known in the art. Typically, the storage device 304 may comprise a programmable read only memory (PROM) or an electrically erasable PROM (EEPROM), although other types of storage devices, as described above, may be equally employed. For example, the parameters stored in the storage device 304 comprise dynamic frame rate capabilities (DFRCs) 308 of the display 302. These DFRCs 308 establish the display's ability to dynamically change refresh rates without image corruption. In a presently preferred embodiment, the DFRCs 308 comprise a range of allowed refresh rates for the display, as well as an indication of a preferred method for dynamically adjusting refresh rates. As described in greater detail below, an IRU within a device uses the DFRCs 308 to determine a minimum rate that meets the minimum required refresh rate of the display device as well as the image rate of a given content source.

A display 302 in accordance with the present invention must be capable of supporting dynamic frame rates, preferably even on a frame-by-frame basis. In support of this requirement, the display interface 306 controls communications with a device (i.e., the device's IRU) and terminates any communication protocols implemented between the device and the display 302. Generally, the rate at which a display interface transfers data from the device to the display is a function based on fixed display parameters, particularly a vertical parameter, a horizontal parameter and a pixel period. As in virtually all types of displays, the actual display screen is comprises of thousands of pixels vertically arranged in rows of fixed lengths. The image is displayed on the screen by repeatedly refreshing the pixels many times per second. To this end, a vertical parameter, e.g., the vertical synchronization rate of the display, controls the rate at which the entire screen (or half of the screen in an interlaced display) is refreshed. A horizontal parameter, e.g., the horizontal synchronization rate, controls the rate at which individual rows or lines of pixels are refreshed. The vertical and horizontal synchronization signals, in addition to the synchronization pulses themselves, also include "blanking" intervals between pulses during which no image data is sent. The vertical and horizontal synchronization signals occur during the blanking intervals, and are preceded and followed by what are referred to as a "front porch" (prior to a pulse) and a "back porch" (subsequent to the pulse). The blanking interval provides time for resetting control circuitry used to target the pixels. The front and back porches on each signal serve as "guards" against variations in pulse timing. The pixel period corresponds to the time required to transmit the necessary data for refreshing a single pixel. Changing the display refresh rate requires changing the image update rate. Normally, this takes time, and pixel data is lost in that transition time, which itself will cause visual corruption of the display image.

However, as described above, certain prior art techniques allow for dynamic display refresh rates by keeping the pixel period and the horizontal synchronization frequency fixed, while allowing the vertical synchronization front porch time to vary. The vertical synchronization active time (i.e., the duration of each vertical synchronization pulse), vertical synchronization back porch time stay constant. In this manner, the display refresh rate can be varied. This same method could be applied to any display interface. For example, with digital display interfaces any parameter of the vertical blanking (front porch, vertical synchronization, back porch) or of the horizontal blanking (front porch, horizontal synchronization, back porch) can be readily adjusted. Furthermore, in the recently-proposed DisplayPort interface, clocking of the display interface is decoupled from the video stream data rate. Information passed over the DisplayPort interface indicates how to recover the video stream clock rate from the interface clock rate. If the video stream clock recovery logic in the DisplayPort receiver can react fast enough to changes in the video stream clock rate (as indicated by signals on the link), then the video stream rate could be dynamically adjusted on a frame-to-frame (or perhaps finer) basis. Also, any method of dynamic refresh rate that applies to interfaces with a direct coupling between the interface rate and video stream rate (i.e., a fixed rate) could also apply to interfaces where the two rates are decoupled.

Furthermore, by using this approach, the display device may be able to save additional power by shutting down some of its logic components. For example, in an LCD panel, column driver and/or row driver circuits (used to address individual pixels) could be put into low power mode at the start of vertical blanking and would remain in low power mode until a certain programmable amount of time after the start of the vertical synchronization pulse. Since the time between vertical synchronization and active display is fixed, and the time it takes driver circuitry to be re-powered and initialized is known (display specific), certain displays incorporating programmable timing controllers, for example, can easily wait a programmable time from vertical synchronization before powering up and re-initializing the row and column drivers.

Figure 4:
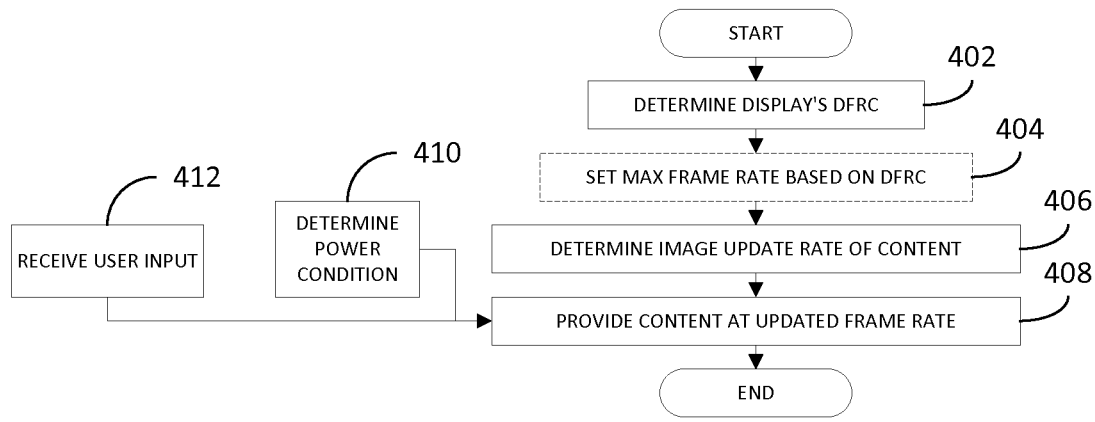
FIG. 4 is a flow chart illustrating processing by an image rendering unit of a device in accordance with the present invention.

Referring now to FIG. 4, a flow chart illustrating operation of a device in accordance with the present invention is illustrated. Unless otherwise noted, the processing illustrating in FIG. 4 is preferably implemented using one or more processors operating under the control of executable instructions stored in suitable memory devices. However, as is known to those having ordinary skill in the art, other implementation techniques may be equally employed, such as programmable logic arrays, ASICS, state machines, etc.

At block 402, a device first determines, preferably via its IRU, the DFRCs for a given display. That is, in a presently preferred embodiment, the IRU detects that the display device is capable of dynamic refresh rates without image corruption. As noted previously, the DFRCs preferably include data regarding the allowed ranges (minimum and maximum) of the display refresh rate, and the preferred method of dynamically adjusting the rate, as described above. This communication is preferably done via standard extensions to the EDID infrastructure, but could also be done using vendor-specific EDID extensions or any other method of communication between the display device and the rendering device. For devices with integral displays, the IRU could be pre-programmed with the knowledge of the dynamic refresh rate abilities of the display. Further still, the IRU could be could be pre-programmed with the knowledge of the dynamic refresh rate abilities of a number of different displays indexed according to, e.g., display type and/or brand. In this case, the necessary dynamic refresh rate abilities of the display can be ascertained through a determination of the display type and/or brand.

Thereafter, at block 404, a maximum frame rate can be optionally determined based on the DFRCs for the display. In one embodiment of the present invention, the maximum frame rate may be designated as the initial frame rate. Thereafter, image data provided to the display may be provided at the initial frame rate absent a change to the frame rate as determined in accordance with the present invention. Setting the initial rate at the maximum frame rate, or at least some frame rate that may be decreased, provides the opportunity to obtain power savings, should the need arise, by reducing the frame rate. Alternatively, an initial frame rate other than the maximum frame rate will also allow for the possibility of increasing the frame rate, if desirable.

Processing continues at block 406 where, for a given content source, an image frame rate is determined. Virtually any technique that may be employed for determining an image frame rate corresponding to a given content type may be equally employed in the present invention. For example, a table may be maintained in which various type of content (e.g., video content, 3D graphics, etc.) are stored along with corresponding values for suitable frame rates for each type of content. In this manner, the determination made at block 406 is reduced to a table look up operation based on knowledge of the content to be included in the image data. Alternatively, static frame detection may be employed to determine when an image be provided to the display is not changing. Techniques for performing static frame detection are well know in the art. In yet another embodiment, the image rate may be based on the processing load being placed on the IRU. For example, particularly in the case of 3D graphics, it may be desirable to maintain IRU performance at or near its maximum processing capability, i.e., a target processing load. Based on a determination of current processing load (using techniques known to those of skill in the art), the image rate may be dynamically increased (or possibly decreased) in an effort to match the IRU processing load to the target processing load. For example, if the target processing load is 90% of maximum processing capability, and, at the current image rate, the IRU is only operating at 80% of its maximum capability, the image frame rate can be set at a higher rate (in either a smoothly continuous or stepwise fashion) until the desired 90% loading target is met.

Thereafter, at block 408, the content (in the form of a continuous stream of image data frames) is provided to the display (by the IRU or other component of the device) at an updated frame rate. The updated frame rates is determined based on the image frame rate and the dynamic frame rate capabilities of the display. If necessary, the rendering unit also indicates to the display device if it intends to use an updated refresh rate via the display interface or any other suitable communication channel. Preferably, the updated frame rate is simply the image rate of the content if the image rate falls within the capabilities of the display.

If, however, the source image rate falls beneath the minimum rate of the display device, the IRU has a few options. It could either simply repeat image frames as needed to achieve a rate within the display limits. More generally, any integer multiple of the image source rate with the minimum and maximum display refresh rates can be used. For example, consider a 24 Hz film source and a display with a 30 Hz to 60 Hz dynamic refresh rate ability. In this case the IRU could repeat each film frame, thereby resulting in a 48 Hz image rate. If there is no integer multiple between the image rate and the display rate, then again frame repetition or frame rate conversion from the source image rate to the display rate can be used (as is known in the prior art for fixed refresh rate displays). Further still, frame rate conversion (interpolation) can be used to arrive at a suitable rate, or for the purpose of improving display image quality relative to simple frame repetition. Referring again to the example given above, the IRU could instead interpolate the 24 Hz film frames to provide 48 unique images per second, thereby resulting in smoother image motion. In these cases the best visual result will be obtained by using the maximum possible display refresh rate. However lower rates might be used if it saves power or involves a simpler ratio between source image rate and display refresh rate.

In an alternative embodiment, the power condition of the device may also incorporated into the determination to provide the content at the updated frame rate, as illustrated by block 410. For example, if the devices runs on battery power, which batteries are determined to be running low (for example, as determined by the power monitor 212 illustrated in FIG. 2), then it may be desirable to reduce power consumption by lowering the frame rate used in conjunction with the display. Further still, the updated frame rate may incorporate user input as indicated by block 412. In this case, the user of the device may explicitly provide an input (using any of the mechanisms described above) indicating that the IRU should adjust the frame rate of the display.

Although a single iteration of the processing illustrated by blocks 402-412 has been described above, in practice, this processing is continuously performed. Thus, for example, after providing content at an updated frame rate at block 408, a typical implementation of the present invention will allow for further processing as described relative to any of the remaining blocks. In this manner, the process of updating frame rates is constantly dynamic and able to adjust quickly to the requirement of any given content.

Figure 5:
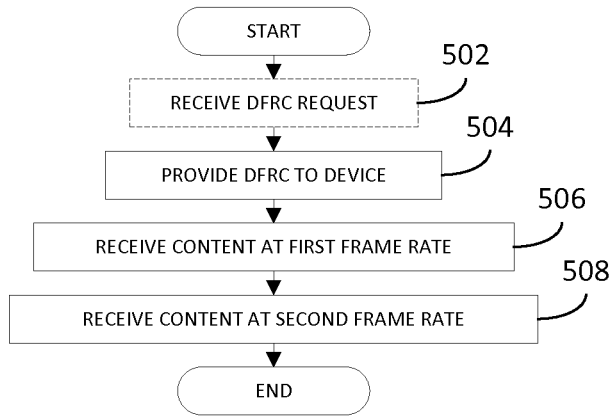
FIG. 5 is a flow chart illustrating operation of a display in accordance with the present invention.

Referring now to FIG. 5, operation of a display in accordance with the present invention is further illustrated. Starting at block 502, the display may receive a request from the device (preferably via the IRU) for the display's DFRCs. Thereafter, at block 504, the display provides the DFRCs to the device in accordance with known techniques. At block 506 the display receives content at a first frame rate. In a presently preferred embodiment, the first frame rate may comprise an initial frame rate corresponding to the maximum frame rate of the display. Alternatively, the first frame rate may be something other than a maximum possible frame rate as determined by previous display data provided to the display. Regardless, at block 508, the display subsequently receives content at a second frame rate that is different from the first frame rate. The second frame rate is preferably selected in accordance with the previously described techniques. Additionally, if necessary, the display may receive an indication from the device, prior to receiving the subsequent content, that it intends to use the second frame rate using any suitable communication channel. Once again, it should be noted that processing of any of the blocks illustrated in FIG. 5 may be repeated as necessary, particularly blocks 506 and 508, in order to continuously and dynamically adjust the display frame rate.

Figure 6:
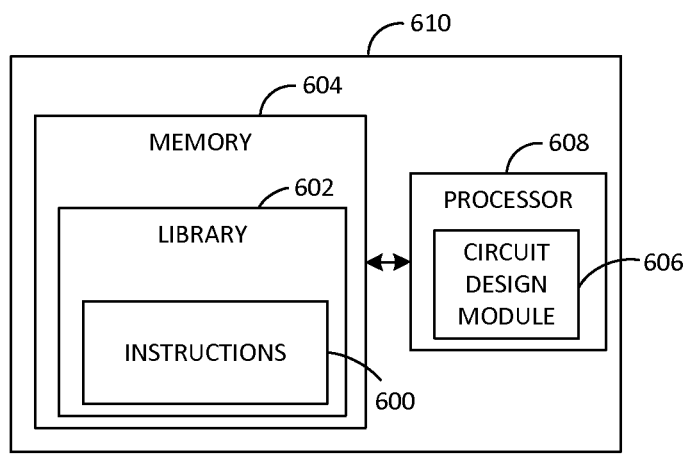
FIG. 6 is an block diagram of an exemplary hardware design that may be used to implement the present invention.

Referring now to FIG. 6, the processing described by the present invention may be embodied in a hardware-based implementation, such as an integrated circuit. To this end, as known by those of skill in the art, a set of executable instruction 600 may be defined and stored within a library 602 that, in turn, is stored in memory 604. The instructions 600, which may comprise instructions represented in any suitable hardware design language (HDL) including, but not limited to, Verilog or another hardware representation such as GDSII, can be used by a circuit design module 606 that is executed on a processor 608 of an integrated circuit design system 610. Using the instructions 600, the system 610 may employed to create a suitable integrated circuit (or other hardware embodiment) capable of performing the processing described herein. Such system 610 and circuit design module 606 may be any suitable system and integrated circuit design program as known to those skilled in the art.

As described above, the present invention provides a technique for a dynamically adjusting the frame rate of a display to accommodate different types of content having different image frame rates or to provide power savings opportunities. This is achieved by the determining the dynamic frame rate capabilities of the display as well as the image frame rate, and selecting an updated frame rate. Displays can accommodate dynamic frame rates through modification of horizontal or vertical timing parameters. For at least these reasons, the present invention represents an advancement over prior art techniques.

It is therefore contemplated that the present invention cover any and all modifications, variations or equivalents that fall within the spirit and scope of the basic underlying principles disclosed above and claimed herein.

What is claimed is:

1. In a device comprising an image rendering unit for communication with a display, a method for dynamically adjusting a frame rate of the display by the image rendering unit, the method comprising:
   determining dynamic frame rate capabilities of the display and an indication of a preferred method of how to dynamically adjust the frame rate of the display as stored and communicated from the display;
   determining an image frame rate of content to be provided to the display based on a rate at which a content source provides frames for the display; and
   providing the content to the display at an updated image frame rate based on the determined image frame rate, based on the determined dynamic frame rate capabilities of the display and based on the determined indication of the preferred method of how to dynamically adjust the display frame rate of the display.

2. The method of claim 1, wherein determining the dynamic frame rate capabilities further comprises receiving information regarding the dynamic frame rate capabilities from the display comprising dynamic frame rate range information for the display.

3. The method of claim 1, wherein determining the image frame rate of the content further comprises determining the image frame rate based on at least one of: content type, static frame detection, image rendering unit loading and a power condition of the device.

4. The method of claim 3, wherein determining the image frame rate based on the image rendering unit loading further comprises:
   determining a target processing load for the image rendering unit; and
   setting the image frame rate so that the image rendering unit operates substantially at the target processing load.

5. The method of claim 1, wherein providing the content at the updated frame rate further comprises modifying at least one of: a pixel period, a horizontal parameter and a vertical parameter corresponding to the frame rate.

6. The method of claim 1, further comprising:
   setting a frame rate that is less than or equal to a maximum frame rate of the display, based on the dynamic frame rate capabilities, as an initial frame rate.

7. The method of claim 6, wherein the updated frame rate is less than the initial frame rate.

8. The method of claim 1, further comprising providing the content to the display at the updated frame rate based on the image frame rate, the dynamic frame rate capabilities and a power condition of the device.

9. The method of claim 1, further comprising providing the content to the display at the updated frame rate based on the image frame rate, the dynamic frame rate capabilities and an input from a user of the device.

10. A device comprising:
    a power monitor operative to determine a power condition of the device; and
    an image rendering unit, in communication with the power monitor, operative to:
       determine dynamic frame rate capabilities of the display and an indication of a preferred method of how to dynamically adjust the frame rate of the display as stored and communicated from the display;
       determine an image frame rate of a content to be provided to the display based on a rate at which a content source provides frames for the display; and
       provide the content to the display at an updated image frame rate based on the determined image frame rate, based on the determined dynamic frame rate capabilities of the display and based on the determined indication of the preferred method of how to dynamically adjust the display frame rate of the display.

11. The device of claim 10, wherein the image rendering unit is further operative to determine the image frame rate based on at least one of: content type, static frame detection and image rendering unit loading.

12. The device of claim 10, wherein the image rendering unit is further operative to provide the content at the updated frame rate via modification of at least one of: a pixel period, a horizontal parameter and a vertical parameter corresponding to a display frame rate.

* * * * *